(12) United States Patent
Nayak et al.

(10) Patent No.: US 8,683,433 B2
(45) Date of Patent: Mar. 25, 2014

(54) ADAPTIVE CHANGE MANAGEMENT IN COMPUTER SYSTEM LANDSCAPES

(75) Inventors: Shiva Prasad Nayak, Bangalore (IN); Arindam Bhattacharjee, Bangalore (IN); Ralf-Juergen Hauck, Heidelberg (DE); Andrey Hoursanov, Manheim (DE); Pravesh Katyal, Bangalore (IN)

(73) Assignee: Business Objects Software Limited, Dublin (IE)

( * ) Notice: Subject to any disclaimer, the term of this patent is extended or adjusted under 35 U.S.C. 154(b) by 406 days.

(21) Appl. No.: 13/165,846

(22) Filed: Jun. 22, 2011

(65) Prior Publication Data

US 2012/0331447 A1 Dec. 27, 2012

(51) Int. Cl.
  *G06F 9/44* (2006.01)
(52) U.S. Cl.
  USPC ............................ 717/120; 717/122; 717/123
(58) Field of Classification Search
  None
  See application file for complete search history.

(56) References Cited

U.S. PATENT DOCUMENTS

| | | | |
|---|---|---|---|
| 7,856,450 B2 | 12/2010 | Allerton et al. | |
| 8,037,088 B2 * | 10/2011 | Chatterjee et al. | 707/769 |
| 8,352,514 B2 * | 1/2013 | Palaniappan | 707/805 |
| 8,438,532 B2 * | 5/2013 | Fox et al. | 717/122 |
| 8,473,894 B2 * | 6/2013 | Fox et al. | 717/120 |
| 8,561,023 B2 * | 10/2013 | Abrams et al. | 717/122 |
| 8,572,550 B2 * | 10/2013 | Fox et al. | 717/120 |
| 8,612,936 B2 * | 12/2013 | Fox et al. | 717/120 |
| 8,615,741 B2 * | 12/2013 | Hudson | 717/123 |
| 8,627,270 B2 * | 1/2014 | Fox et al. | 717/120 |
| 2008/0066071 A1 * | 3/2008 | Jain et al. | 717/123 |
| 2008/0222606 A1 * | 9/2008 | Solirov et al. | 717/122 |
| 2009/0024561 A1 * | 1/2009 | Palanisamy | 707/1 |
| 2009/0093268 A1 * | 4/2009 | Amano | 455/550.1 |
| 2009/0319799 A1 * | 12/2009 | Carpenter et al. | 713/189 |
| 2010/0023920 A1 * | 1/2010 | Chaar et al. | 717/102 |
| 2010/0077380 A1 * | 3/2010 | Baker et al. | 717/120 |
| 2010/0161645 A1 * | 6/2010 | Chatterjee et al. | 707/769 |
| 2010/0205224 A1 * | 8/2010 | Palanisamy et al. | 707/803 |
| 2012/0078859 A1 * | 3/2012 | Vaitheeswaran et al. | 707/693 |
| 2012/0180024 A1 * | 7/2012 | Gonzalez et al. | 717/122 |
| 2012/0311534 A1 * | 12/2012 | Fox et al. | 717/120 |
| 2012/0317075 A1 * | 12/2012 | Pasumarthi et al. | 707/626 |
| 2013/0074038 A1 * | 3/2013 | Fox et al. | 717/122 |
| 2013/0091488 A1 * | 4/2013 | Koutyrine et al. | 717/120 |
| 2013/0091491 A1 * | 4/2013 | Koutyrine et al. | 717/123 |
| 2013/0166547 A1 * | 6/2013 | Pasumarthi et al. | 707/728 |
| 2013/0212562 A1 * | 8/2013 | Fox et al. | 717/120 |

OTHER PUBLICATIONS

Hafeez et al., "A Requirement Change Management Framework for Distributed Software Environment", 2012 IEEE, ICCCT'12, Dec. 5, 2012, pp. 944-948; <http://ieeexplore.ieee.org/stamp/stamp.jsp?tp=&arnumber=6530470>.*

Filippo Lanubile, "Collaboration in Distributed Software Development", Springer-Verlag Berlin Heidelberg 2009, ISSSE 2006-2008, LNCS 5413, pp. 174-193; <http://link.springer.com/chapter/10.1007%2F978-3-540-95888-8_7>.*

Salehie et al., "Self-Adaptive Software—Landscape and Research Challenges", May 2009 ACM, vol. 4, No. 2, Article 14, pp. 14:1-14:42; <http://dl.acm.org/results.cfm?h=1&cfid=283423755&cftoken=4201022>.*

* cited by examiner

*Primary Examiner* — Thuy Dao
*Assistant Examiner* — Ben C Wang

(57) ABSTRACT

An adaptive automatic change management for computer system landscapes is described herein. A predefined set of attributes are extracted or obtained for a computer system artifact, together with a number of values assigned to the set of attributes. A unique identification section is created and distributed among the computer systems in the landscape based on the set of attributes and the assigned values, where the unique identification section encompass computer system artifacts of a same kind. A modification of an artifact of the same kind is tracked at a computer system. The tracked modification is automatically applied in the computer system to one or more incoming computer system artifacts of the same kind.

19 Claims, 9 Drawing Sheets

ADAPTIVE CHANGE MANAGEMENT IN COMPUTER SYSTEM LANDSCAPES

TECHNICAL FIELD

The field relates generally to data processing and digital processing systems. More specifically, the field is related to software change management within multi computer systems landscapes.

BACKGROUND

Today's business information systems maintain a large number of documents. For example, the customers of business intelligence (BI) systems have numerous repositories where information is piled up as a result of day-to-day activities. Efficient life cycle management in such overcrowded environments becomes a very challenging task. Life cycle management (LCM) primarily involves flow of objects, e.g., software or data components, between different information system environments, such as development, testing and production environments, defined in a common computer system landscape, e.g., enterprise computer system landscape.

Usually, the separate computer system environments, in a landscape, work autonomously. The flow or transportation of objects from one environment to another is typically followed by updates or adjustments to fit the transported objects in the new environment. Such updates ensure that objects interact properly with their new dependencies and without unnecessary downtime. For example, a BI Report's application objects may be developed in a development computer system environment, tested for acceptance in a test environment, and transported for live consumption in a production computer system environment. Each of the computer environments may have its own resources to be consumed by the BI Reports, e.g., separate servers, databases, etc. Hence, on arrival in a new computer system environment, database connections of a BI Report have to be overridden to point to databases available in the new environment. Otherwise, the BI Report may fail or run properly, which can result in downtime period for the current computer system environment.

The big number of software, and data components maintained in enterprise computer system landscapes, requires a lot of resources for their lifecycle management (LCM). Often, LCM involves manual updates of the transported objects, which creates conditions for overhead, errors and extensive downtimes. This creates critical and all-encompassing problems that arise across different objects and across different user scenarios. For example, a customer may have set a draft description for each of many objects in a development environment. Whenever any of the objects is transported to a production environment, the assigned draft description must be replaced by a final verified description. Task of performing such changes, regardless of how complex or simple they are, may involve manual operations over a number of objects over a number of transports. Often, the number of such objects and transports exceeds several thousands in large and even midsize enterprise computer system landscapes.

SUMMARY

Various embodiments of systems and methods for adaptive change management in computer system landscapes are described herein. According to one aspect, a predefined set of attributes are extracted or obtained for a computer system artifact. A number of values assigned to the set of attributes are extracted as well. A unique identification section is created based on the set of attributes and the assigned values to identify computer system artifacts of a same kind. The unique identification section is distributed to a number of computer systems in the landscape. According to another aspect, a modification of an artifact of the same kind is tracked at a computer system, and stored together with the unique identification section. In yet another aspect, the tracked modification is automatically applied in the computer system to one or more newly received computer system artifacts of the same kind.

These and other benefits and features of the embodiments will be apparent upon consideration of the following detailed description of preferred embodiments thereof, presented in connection with the following drawings.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for adaptive change management in computer system landscapes are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
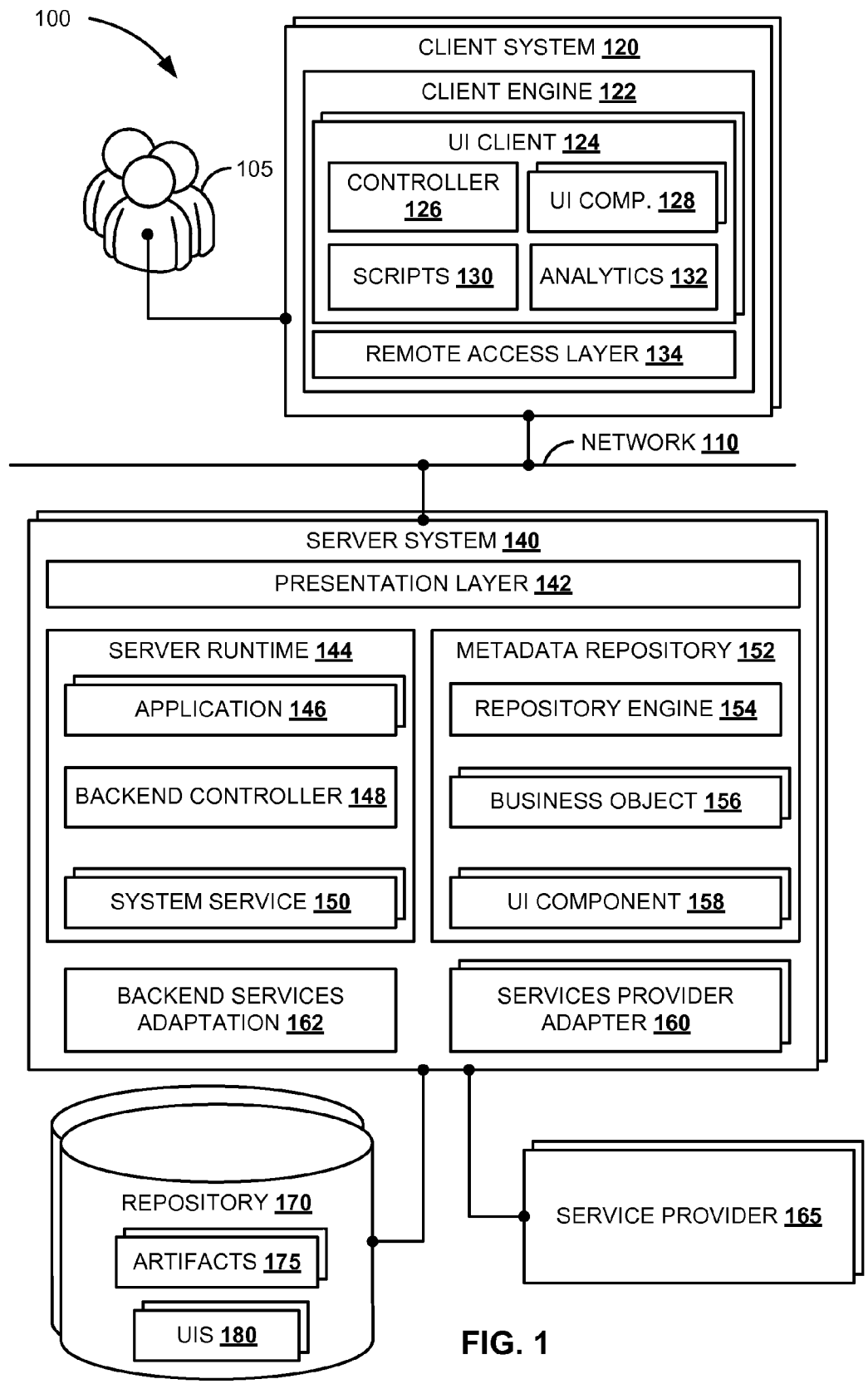
FIG. 1 is a block diagram illustrating a computer system landscape implementing adaptive change management, according to one embodiment.

FIG. 1 is a block diagram showing computer system landscape 100 where adaptive change management is performed for distributed systems, according to one embodiment. The computer system landscape 100 includes a rather simplified example of classic client-server architecture. One or more shareholders or users 105, e.g., software product designers, developers, quality assurance (QA) specialists, end users, managers, etc., operate on one or more client systems 120. Users 105 may request different services or execute various operations available within client systems 120, or provided by one or more server systems 140 via network 110. The illustrated server systems 140 represent one or more backend nodes in the computer system landscape 100.

The client systems 120 and the server system nodes 140 communicating via network 110 may define a number of different computer system environments. Some of the elements of the computer system landscape 100 resemble the structure and functionality of software modules developed by SAP AG. However, structures with similar functionalities could be found in software products developed by other vendors, as well. Alternative embodiments may utilize other kinds of computer system architectures.

The involved client systems 120 may have similar or different structures where one or more of the illustrated modules are replicated. One or more users 105 may operate within one or more instances of user interface (UI) client 124 of one or more of client systems 120. Different users 105 may exclusively access different instances of the UI client 124 within a same client system 120.

In one embodiment, any of client systems 120 may execute a standalone client application, e.g., client engine 122, to interact with the backend server system 140. Alternatively, an intermediate layer may be downloaded to any of the client systems 120 as an extension of a running Internet browser. Such intermediate layer may be also illustrated as client engine 122. The standalone client application and the intermediate layer may have similar components and functionality. Client engine 122 takes responsibility for rendering the necessary client functionality, and also for communicating with server systems 140 via network 110 when necessary.

The client engine 122 includes UI client instances or sessions 124 that may also embed into a browser integrated framework. The UI client 124 may be a part of any popular browser integrated framework, e.g. Silverlight® provided by Microsoft Corp, Flex® provided by Adobe Systems Inc., JavaFX® originally developed by Sun Microsystems Inc., etc. In one embodiment, the client engine 122 and UI client 124, respectively, may be desktop application, for example, a .NET® application rendering a UI through a Windows Prosecution Foundation (WPF) system. The UI client 124 accesses the necessary business data at the backend 140 through remote access layer 134 via network 110. In one embodiment, no dedicated UI server or client programs are needed. The communication with the backend 140 may include extracting, storing and updating data. The data may be transported to repositories 170, especially when backend 140 implements a number of server nodes in separate computer system environments.

In one embodiment, users 105 generate services requests at UI client 124. UI components module 128 instantiates one or more appropriate graphical user interface (GUI) screens or controls in response to the user request. The behavior of the UI components is managed by controller 126. The controller 126 makes sure that all instantiated controls in the UI components 128 are initialized. The controller is also responsible for the execution of any configured operation triggered by events corresponding to the instantiated controls. In case when some of the operations involve execution of script segments, the controller 126 may trigger the execution of these scripts via scripts module 130. In one embodiment, scripts module 130 is a frontend scripting engine. Analytics module 132 may be used for frontend data processing when necessary.

In one embodiment, the backend 140 utilizes presentation layer 142 to connect to the Internet and/or to other public or private networks, and to provide access for the UI client sessions 124 to underlying business functions and data structures. For example, the presentation layer 142 may generate the UI object model underlying the UI controls instantiated in the UI components module 128 at the client systems 120. In one embodiment, presentation layer 142 may be part of the server runtime 144.

The server runtime 144 provides environment where one or more software applications 146 are executed. For example, the applications 146 may provide a number of business services for the users 105, where various operation requests related to the business services are created at client systems 120. The requests are translated to corresponding process tasks performed by the applications 146 executed in server runtime 144.

In one embodiment, the server runtime 144 includes backend controller 148 for one or more UI client sessions 124 to handle the requested UI components, e.g., when a UI client session 124 triggers an initialization of a UI component for the first time. The backend controller 148 may manage the collaboration between the requested UI components and one or more underlying business objects. System services 150 in the server runtime 144 may be used to administer the characteristics of the server runtime 144, e.g., its engine parameters, the user access to one or more components, the processes execution, the communication with other runtime environments, like, external systems, databases, etc. In one embodiment, system services 150 may also provide deployment, setup and change management of software components.

Metadata repository 152 is generally the place where metadata about the computer programs deployed in the server system 140 are preserved, according to one embodiment. There are different kinds of metadata that could be maintained by the metadata repository 152. For example, the repository 152 keeps the description of the business objects 156 underlying the applications 146. In one embodiment, metadata repository 152 keeps description of the available UI components 158 and the relationships between them as designed.

Repository engine 154 manages the metadata and the collaboration with the server runtime 144 at one hand, and with various service providers 165 at the other hand. The service providers 165 may render services and/or corresponding UI components to the backend 140 as defined in the metadata. The service providers 165 are available via service provider interfaces 160, and can be either internal or external to the backend 140. In one embodiment, backend services adaptation 162 represents a layer that helps to adjust the designed UI or rendered UI components to a set of normalized business objects available at the server system 140.

In a multi server system environment, e.g., in a cluster of more than one server system nodes 140, repository 170 may be used to persist different kinds of common data, including programming code, business data, metadata, etc. In one embodiment, one or more different repositories 170 may be assigned to different computer system environments defined in the computer system landscape 100

In one embodiment, users 105 may design, create or change a program component, a data object or some other type of computer system artifact by manipulating UI components 128 associated with particular application or software tool. The UI components 128 may be available within GUI environment of the UI client 124. The manipulations of the UI components 128 may trigger execution of various system or application procedures in server runtime 144. Further, the manipulations of the UI components 128 may lead to changes in the metadata repository 152, e.g., changes in the definitions of the UI components 158, even to changes in the descriptions of the business objects 156, etc.

For example, by manipulating UI components 128 or by directly entering program code, a user 105 may create a BI Report artifact in development computer system environment in the landscape 100. The BI Report could be stored as artifact among other artifacts 175 in repository 170. A user 105 may perform tests with the created BI Report to prove its quality. Typically, such tests are performed in a separate environment defined in computer system landscape 100. The different environments in the landscape 100 could be logically and even physically isolated, where each environment may encompass one or more separate computer systems, e.g., client systems 120, server system nodes 140, different repositories 170, etc.

In one embodiment, the BI Report artifact may have to be transported from the computer system environment where it is created to the computer system environment where it is tested. The transportation may be requested by a user 105 through a client system 120 and executed by an application 146, a system service 150 or by external service provider 165. The transportation of the BI Report artifact may involve a transfer between different repositories 170. Once received in the testing environment, the BI Report artifact may need to be modified, e.g., to be reconfigured to connected to a different database available in the test computer system environment. Such modification may again be accomplished by manually manipulating UI components 128. Alternatively, the transported artifacts may be updated automatically in the receiving computer system environment by an application 146, system server 150 or by a service provider 165, according to one embodiment.

In this document, the term artifact addresses any kind of program components or objects, data objects, business objects, services, etc., or their descriptions, that are available in a computer system landscape. The artifacts could be classified in different types and kinds. In one embodiment, each kind of artifacts existing in the computer system landscape 100 may be uniquely specified by a number of parameters, attributes or properties common for these artifacts. Such set of attributes may be used to create unique identification section (UIS) for the artifacts. The UIS may also be created based on the values assigned to the predefined attributes to further classify the artifacts of the same kind. In one embodiment, the specified unique identification sections (UIS) 180 for the artifacts 175 of different kinds available in the landscape 100 may be stored in repository 170. Further, in this document the term "computer system environment" or simply "environment" may address one or more autonomous computer systems in a computer system landscape.

Figure 2:
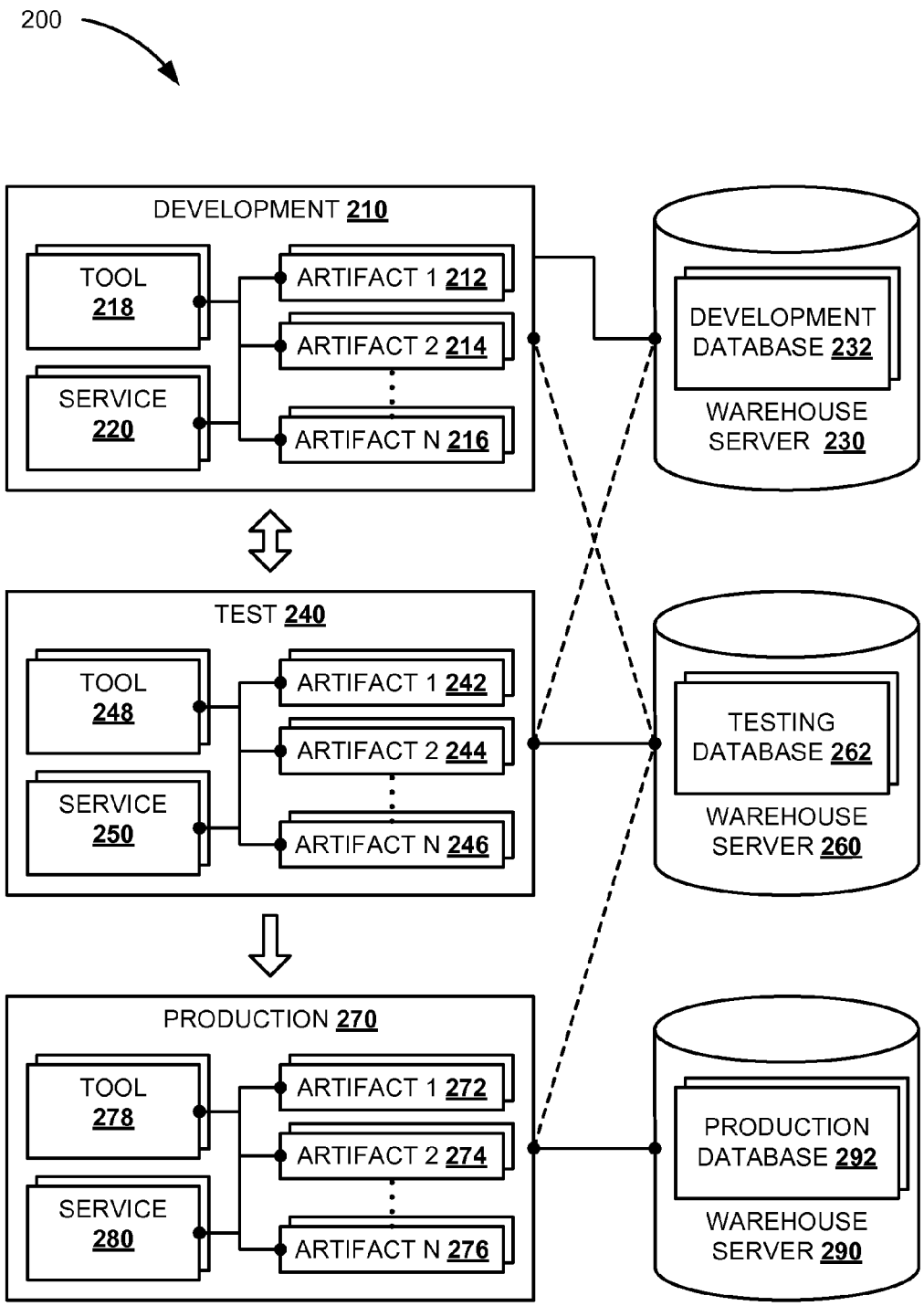
FIG. 2 is a block diagram illustrating different computer system environments of a landscape, according to one embodiment.

FIG. 2 shows exemplary computer system landscape 200 where different environments 210, 240 and 270 are separately illustrated, according to one embodiment. The architecture of the environments 210, 240 and 270 is further simplified compared to the client-server computer system architecture presented in FIG. 1. Tools 218, 248 and 278 correspond to computer applications that could be used to create or manipulate artifacts 212-216, 242-246 and 272-276 of the environments 210, 240 and 270, respectively. In one embodiment, services 220, 250 and 280 may provide system specific functionality such as background processing, import and export of artifacts, runtime engine, etc.

The artifacts 212-216, 242-246 and 272-276 available in the computer system landscape 200 may be of different kinds. In one embodiment, artifacts 212, 242 and 272 represent artifacts of a first kind. Similarly, artifacts 214, 244 and 274 represent artifacts of a second kind, and artifacts 216, 246 and 276 represent artifacts of $N^{th}$ kind, where letter "N" is used to encompass all kinds of artifacts available in the landscape 200. For example, artifacts 212, 242 and 272 may correspond to reports generated by BI applications, such as SAP® Crystal Solutions, e.g., Crystal Reports®, from SAP AG. Similarly, artifacts 214, 244 and 274 may correspond to data connections artifacts, and artifacts 216, 246 and 276 may correspond to Query as a Web Service (QAAWS) artifacts. There is no requirement for the environments 210, 240 and 270 to include artifacts of all kinds.

In one embodiment, computer system environment 210 is a development environment, where new artifacts may be created. For example, a program developer may create a new BI Report artifact, e.g., an artifact 212 of the first kind. The created BI Report artifact 212 may be configured to connect to development database 232 at warehouse 230 during execution. Once the developer is satisfied, the BI Report artifact 212 may be transported to test environment 240 as artifact 242 of the same kind. A quality assurance (QA) specialist may perform various test scenarios over the received BI Report artifact 242 to check for errors or inconsistencies during its execution.

Generally, the transportation of artifacts does not change their setup or description. The BI Report artifact 242 is received at test environment 240 with the configuration and setup generated in the development environment 210. Therefore, BI Report artifact 242 will try to access development database 232 at warehouse server 230 (illustrated with dotted line). However, the test environment 240 may have no established connection to warehouse server 230. Hence, the QA specialist may have to change the configuration of the BI Report artifact 242 to access testing database 262 at warehouse server 260. If the reconfiguration of the received artifact 242 is omitted, the execution of the BI Report in the test environment 240 will generate connection error.

Usually, it takes more than one cycle of testing the generated BI Report. When the QA specialist finds malfunctions in the artifact 242, the BI Report may be transported from the test environment 240 back to the development environment 210. Since the new setup made by the QA specialist is not changed during the backwards transportation, the BI Report artifact 212 received at development environment 210 may be configured to access testing database 262 at warehouse server 260 (illustrated with dotted line). When there is no established connectivity between the development environment 210 and the warehouse server 262, the BI Report artifact 212 has to be reconfigured to connect to development database 232.

Once developed and/or successfully tested, the BI Report may be deployed in the production environment 270, e.g., transported as artifact 272. Together with the deployment, the BI Report artifact 272 needs to be re-configured to access production database 292, e.g., at warehouse server 290.

The simple example of developing, testing and deploying a BI Report outlines the additional efforts necessary for adapting artifacts to different computer system environments during their lifecycle management. In one embodiment, an automatic process is executed in the computer system landscape 200 across the existing computer system environments 210, 240 and 270 to identify the artifacts that could be transported between the environments 210, 240 and 270. The process may be executed by one or more of the services 220, 250 and 280, or may be enabled through an outside server provider to the landscape 200.

In one embodiment, for each identified object, specific reconfigurations in the different environments 210, 240 and 270 are tracked. For example, tools 218, 248 and 278 may be used to manually reconfigure an artifact of a particular kind. The reconfiguration is recorded and applied to all received artifacts of the same kind. Alternatively, a scan may be performed, e.g., by services 220, 250 and 280, to identify the current configuration of the existing artifacts 212-216, 242-246 and 272-276 in the respective environments 210, 240 and 270. The newly received artifacts may be automatically modified to match the setup and/or the descriptions of the artifacts of the same kind present in the receiving environment.

Figure 3:
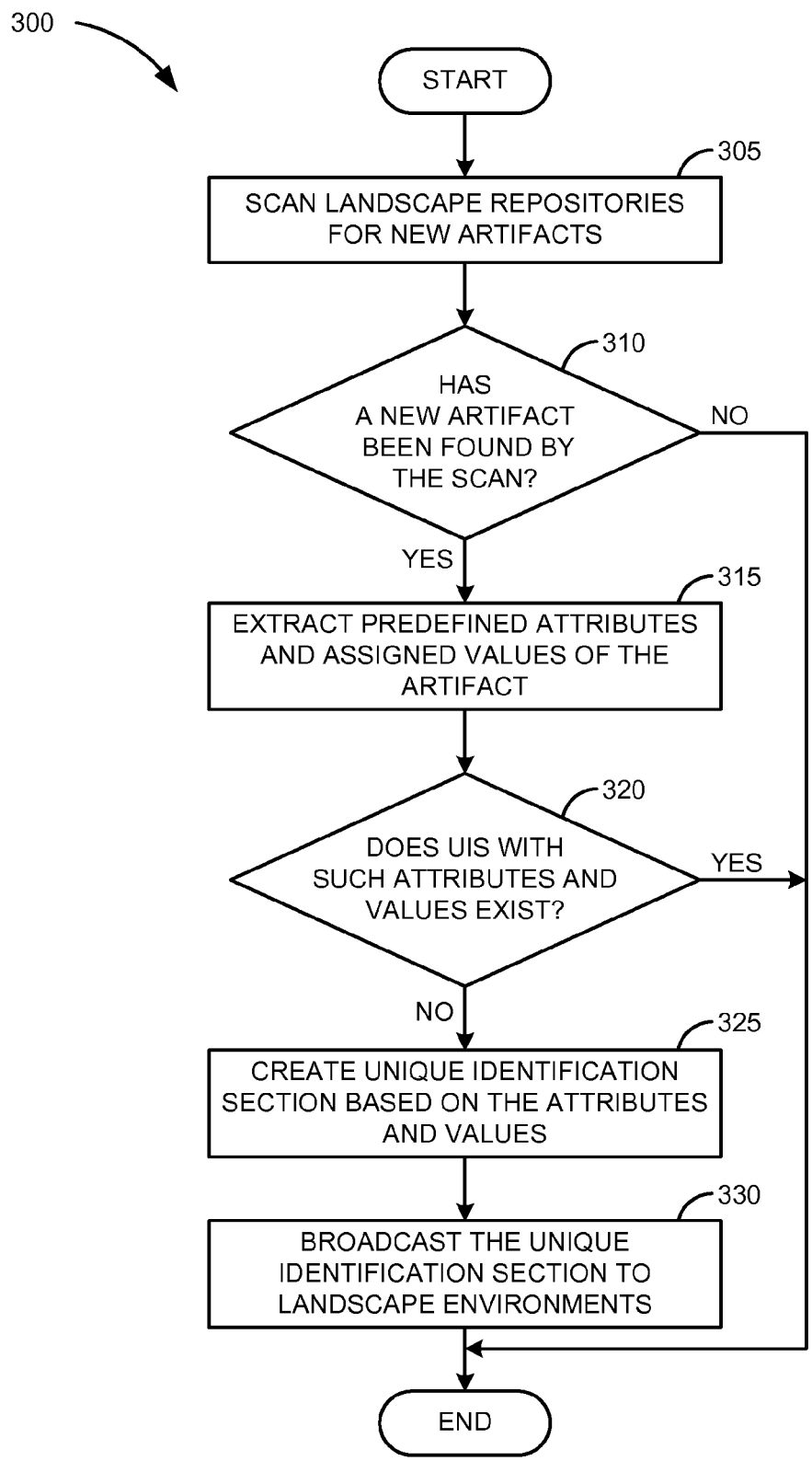
FIG. 3 illustrates a process for discovering artifacts in a computer system landscape, according to one embodiment.

FIG. 3 illustrates a process 300 for discovering artifacts in a computer system landscape, according to one embodiment. Process 300 starts at 305 with a comprehensive scan of the available repositories in the landscape to discover new artifacts. For example, each execution of process 300 will scan the landscape repositories for artifacts that were not present during the previous run of the process 300. In such a case, the first execution of process 300 will register all artifacts present in the computer system landscape.

Usually, the artifacts in the computer system landscape are persisted in a number of repositories assigned to different computer system environments. However, the scan of new artifacts may not be limited only to repositories, but may include other computer system landscape objects, e.g., file systems, client systems, application servers, service providers, network devices, etc. The scan may run in background to the other tasks executed in the computer system landscape, according to one embodiment. For example, the scan may run as a bot process or a crawler that iterates over a predefined set of repositories in the computer system landscape. In one embodiment, the scan may be limited to artifacts of a particular kind.

At 310, a check is performed whether a new artifact has been found by the scan. When a new artifact has been discovered, a set of predefined attributes of the artifact are extracted together with the values assigned to the attributes at 315. Different sets of attributes may be specified for the different kinds of artifacts available in the computer system landscape. The combination of attributes and values needs to be sufficient to identify the kind of the artifact, according to one embodiment. For example, the set of attributes or parameters of a BI Report artifact may include a database name and a server name properties. These attributes together with the assigned values may be used to create a UIS to encompass all BI Report artifacts from a particular computer system environment.

At 320, a check is performed to find out whether a UIS already exists including the extracted attributes and values. For example, a UIS with such attributes and values will exist when a previous scan has discovered an artifact of the same kind. At 325 a UIS is created based on the extracted attributes and corresponding values, when the check at 320 shows that there is no such UIS so far. At 330, the newly created UIS is broadcasted to the different environments of the computer system landscape. In one embodiment, a list of all created UISs in the landscape is stored in the repositories of the different computer system environments. Thus, a computer system environment will have an access to the unique identification section of virtually every kind of artifacts transported across the computer system landscape.

Figure 4:
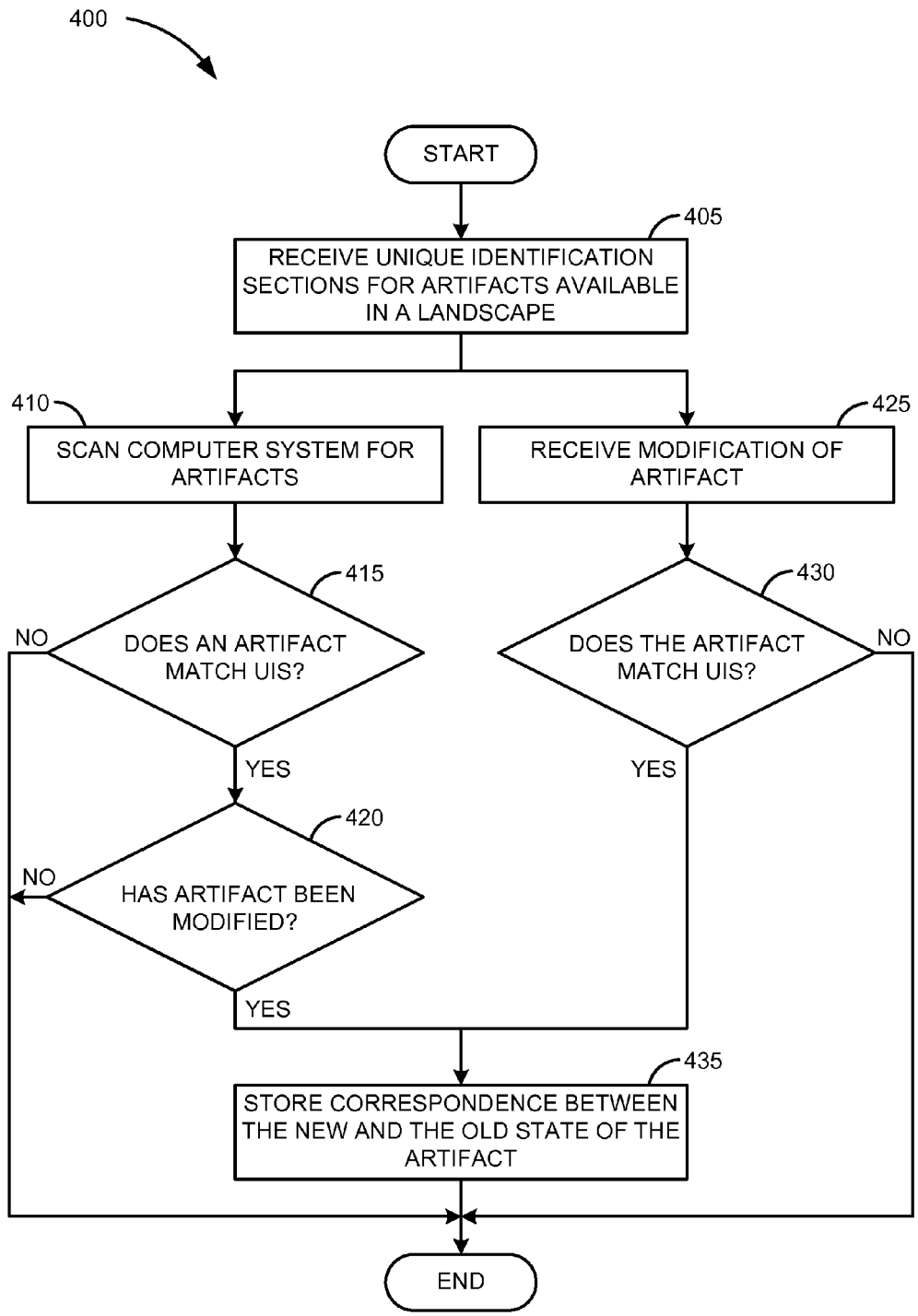
FIG. 4 illustrates a process for tracking a modification of a particular kind of artifacts, according to one embodiment.

FIG. 4 shows process 400 for tracking a modification of a particular kind of artifacts, according to one embodiment. Similar to process 300 of FIG. 3, process 400 may be executed in a specific computer system or in a specific environment defined in a computer system landscape. This specific environment may be addressed as a destination environment, where new artifacts are received from one or more other environments, e.g., source environments, of the computer system landscape. Alternatively, process 400 may be executed in separate computer systems, e.g., in separate environments of the computer system landscape.

At 405, one or more unique identification sections for one or more kinds of artifacts available in the computer system landscape are received. In one embodiment, the received UISs may be locally stored in a repository as a list or a database table. More specifically, the UISs may be persisted in as database table records. One or more primary keys for the database table may be generated based on the artifact attributes and assigned values included in the UISs. The locally persisted set of UISs may include unique identification sections created in the destination environment, according to one embodiment.

At 410, a computer system, is scanned for available artifacts. At 415, a check is performed to find out whether an artifact identified by the scan matches any of the stored UISs. If the check at 415 confirms such a match, at 420 another check is performed to verify whether the artifact has been altered or modified. In case of modification of the artifact, at 435, a correspondence between the old state and the new state of the artifact is stored together with the UIS matching the artifact.

In one embodiment, the check for modification of the artifact is based on a comparison between the values assigned to the attributes of the artifact included in the matching UIS. Alternatively, the changes to the state of the artifacts available in the environment, or in the whole computer system landscape may be logged. Other methods for checking for modifications to artifacts could be applied as well.

Alternatively, or in parallel to the scanning at 410, process 400 may include receiving a modification of an artifact at 425. For example, the modification may involve reconfiguration of the current setup of the artifact, e.g., an attribute or an attribute value of the artifact may be replaced. At 430, it is verified whether the artifact that is modified matches a received or locally created UIS. In case of a match, a correspondence between the old state and the modified state of the artifact is stored together with the UIS matching the artifact at 435. Alternatively, instead of storing correspondence between old and new states, an executable description of the modification or the reconfiguration of the artifact may be stored.

Process 400 may be executed repetitively in its entirety or partially, according to a predefined schedule, or as a result of a triggering event. As a result, a list of UISs for different kinds of artifacts will be created including correspondence between old and the new states for those artifacts that have been altered after transportation.

The list of UIS gives information about what kinds of artifacts are expected to be received, and the appropriate modification to be automatically applied to them, if any. The computer systems across the landscape automatically learn this information using process 400 to track artifact updates that are executed either manually by users via software tools, or automatically by different system processes.

For example, at 425 a user may update a database connection of a BI Report through a client tool or through server configuration distribution. A user may check-in a version into Version Management with a database configuration different from that of a previous version. Alternatively, at 410 to 420, the computer system (or the destination computer system environment) may be registering metadata updates done by users or as a result of automated methods. Such updates may include changes to type of database connection of a BI Report through a report designer. The destination computer system stores correspondence between the old database connection, which may be included in the respective UIS, and the new database connection.

For example, new fields may be added to the specific UIS record in the list of UISs. The new fields hold the corresponding old and new values of the database connection parameters. These mapped values would essentially specify the new database connection properties for the BI Report artifact in the destination environment. This way, new artifacts coming from different source environments configured to connect to an old database may now be automatically redirected to a new database. The destination environment adapts to the applied modifications to automatically change the newly received artifacts.

Figure 5:
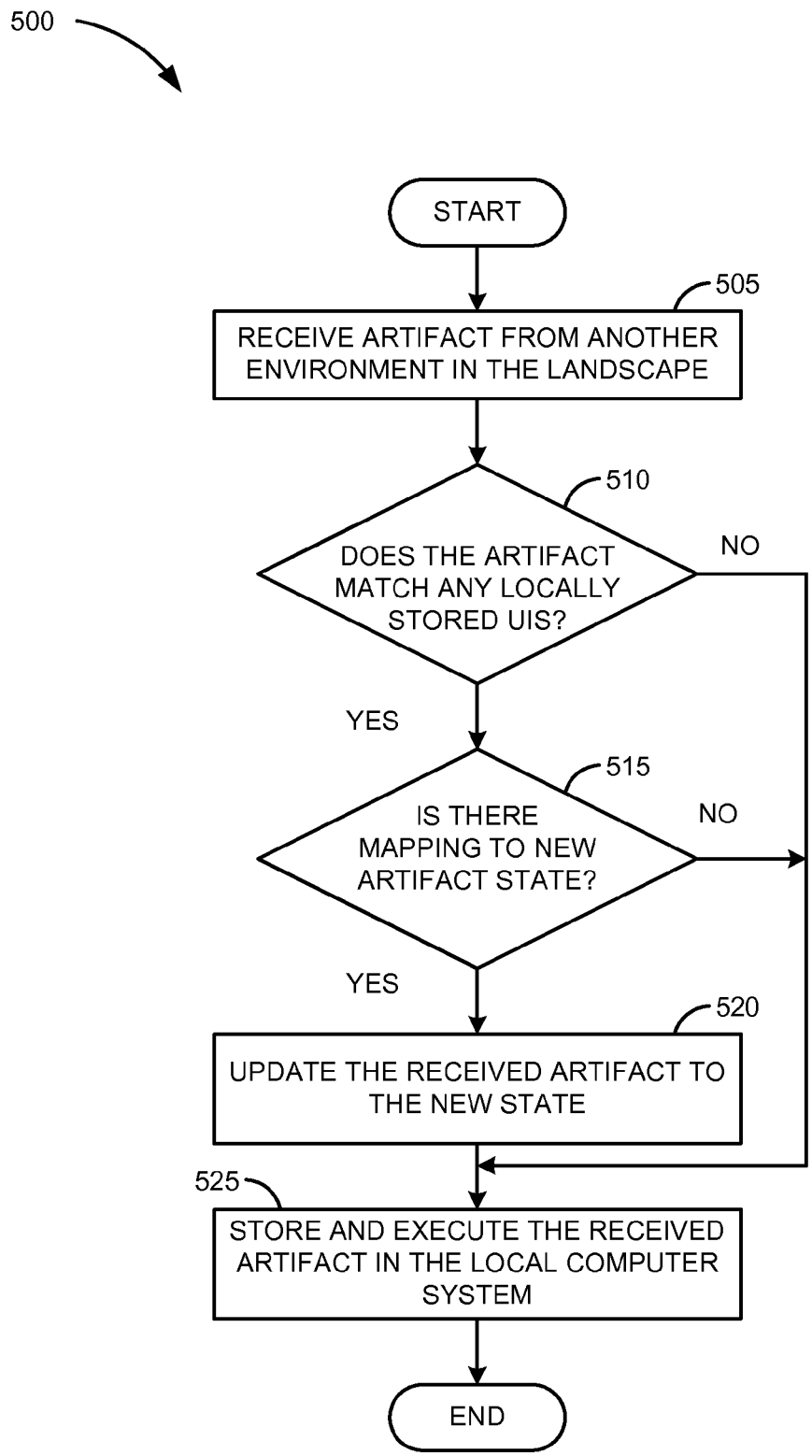
FIG. 5 illustrates a process for automatic update of artifacts transported between different environments in a computer system landscape, according to one embodiment.

FIG. 5 shows process 500 for automatic update of artifacts transported between different environments in a computer system landscape, according to one embodiment. At 505, an artifact is received from another environment of the computer system landscape. At 510, a check is performed to determine whether the artifact matches any of the unique identification sections stored locally, e.g., as a result of executions of processes 300 and 400 illustrated in FIG. 3 and FIG. 4, respectively. For example, a predefined set of attributes and attribute values may be extracted from the received artifact to be used as a search criteria for the UISs. The extracted attributes and/or values may be used to generate a UIS for the received artifact, which UIS to be directly compared to the stored UISs.

If the check at 510 confirms a match of the received artifact to a particular UIS, a new check is performed at 515 to find out whether a mapping to a new state exists for the artifacts matching the UIS. In one embodiment, the locally stored list of UISs may contain only UISs for which a modification of the matching artifacts has been tracked. At 520, the received artifact is automatically updated to the new state, when there is such mapping stored for the matching UIS. The received artifact, whether modified or not, is stored and executed in the receiving computer system at 525.

Processes 300, 400 and 500 illustrated in FIG. 3, FIG. 4 and FIG. 5, respectively show how the modification of computer system landscape artifacts may be automatically performed. Once an artifact is altered, e.g., manually or automatically reconfigured, the change is recorded and automatically applied to other artifacts of the same kind received afterwards. The processes 300, 400 and 500 define an adaptive change management automatically applied in distributed systems. In one embodiment, the modification of an artifact in a computer system may trigger automatic modification of the artifacts of the same kind already present in the system. Such automatic modification may be triggered in other computer systems from the same or from other environments of the landscape as well.

Figure 6:
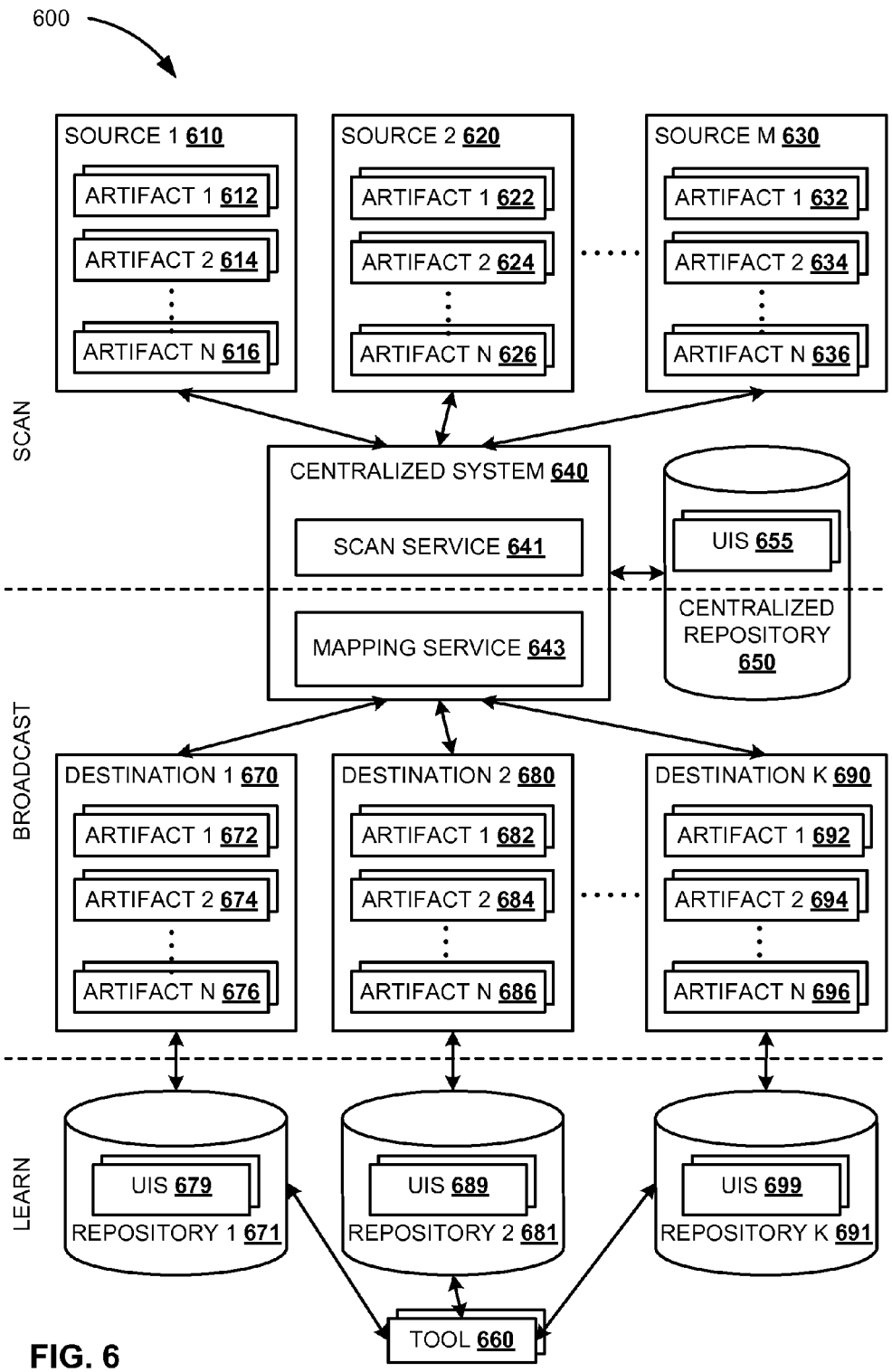
FIG. 6 is a block diagram illustrating computer system landscape nodes along different phases of discovery of artifacts, according to one embodiment.

In one embodiment, a computer system landscape is scanned by a centralized service for artifacts that could be transported between different environments or between different computer systems. FIG. 6 shows computer system landscape 600 where the included nodes are presented along different phases of identification of artifacts, according to one embodiment. Environments 610, 620 and 630 are labeled as source environment, e.g., to encompass a number of "M" environments or computer systems that send artifacts of different kinds 612-616, 622-626 and 632-636, respectively, to other environments. Accordingly, the source environments 610, 620 and 630 are scanned to identify objects that could be transported to destination environments. In FIG. 6, environments 670, 680 and 690 are labeled as destination environments to encompass a number of "K" environments or computer systems in the landscape 600 that could receive artifacts from the source environments 610, 620 and 630.

The separation of the environments or the computer systems 610, 620, 630, 670, 680 and 690 of the landscape 600 to source and destination as shown in FIG. 6 may be just for illustrative purposes. One environment may act as both source environment and destination environment in different scenarios for transporting artifacts.

Centralized system 640 includes scan service 641 and mapping service 643. In one embodiment, the centralized system 640 is separate from source and destination environments 610, 620, 630, 670, 680 and 690. The scan service 641 craws or data-mines the source environments 610, 620 and 630 to identify new artifacts available for transportation. The exact scanning algorithm may depend on the implementation of the scan service and on the setup of the computer systems to be scanned for artifacts. The scanning may be performed by a background process that reads artifacts of specific kinds under predefined conditions across landscape nodes associated with source environments 610, 620 and 630.

In one embodiment, scan service 641 may accumulate artifacts of different kinds. The scan service 641 may use the accumulated artifacts to create unique identification sections for the separate kinds of artifacts based on sets of predefined attributes of the artifacts. Additionally, the generation of the UISs for the different kinds of artifacts may be further based on the values assigned to the sets of attributes. The centralized system 640 may store the information for the scanned kinds of artifacts in a local repository or database 650. The generated UISs 655 may be stored as separate records in one or more related database tables.

The UIS records may be broadcasted to destination environments 670, 680 and 690 where they may be stored in corresponding destination repositories 671, 681 and 691, respectively. In one embodiment, UIS records 679, 689 and 699 replicate the originally created UISs 655. Alternatively, the original list of UISs 655 may be filtered for some or all of the destination environments 670, 680 and 690. Based on such filtering, only UISs for those kinds of artifacts that could be imported in an environment (670, 680 or 690) may be replicated to that environment.

In one embodiment, the artifacts transported to the destination environments 670, 680 and 690, e.g., the different kinds of artifacts 672-676, 682-686 and 692-696, respectively, may be modified. The reception of an artifact at the new (destination) environment is usually followed by manual setup of the artifact or automatic reconfiguration, e.g., by using various computer system tools 660. The changes made to the artifact may be used to create a mapping between the old and the new configuration for all artifacts of the same kind. In one embodiment, the mapping is defined centrally by mapping service 643 of centralized system 640. The centrally specified mapping may be stored in centralized repository 650 along the matching UIS records 655.

The UIS records 655 combined with the tracked modifications can be broadcasted to the destination environments, e.g., 670, 680 and 690, of the computer system landscape 600, and stored in the local database repositories 671, 681 and 691 together with the replicated UISs 679, 689 and 699, respectively. The tracked modifications may be filtered to be sent only to relevant destination environments based on predefined conditions, e.g., only to destination environments that could receive artifacts of the corresponding kinds.

Alternatively, the tracking of changes done to transported artifacts may be performed by local mapping services within the destination environments 670, 680 and 690, and stored locally along with the already replicated UISs 679, 689 and 699, respectively.

Figure 7:
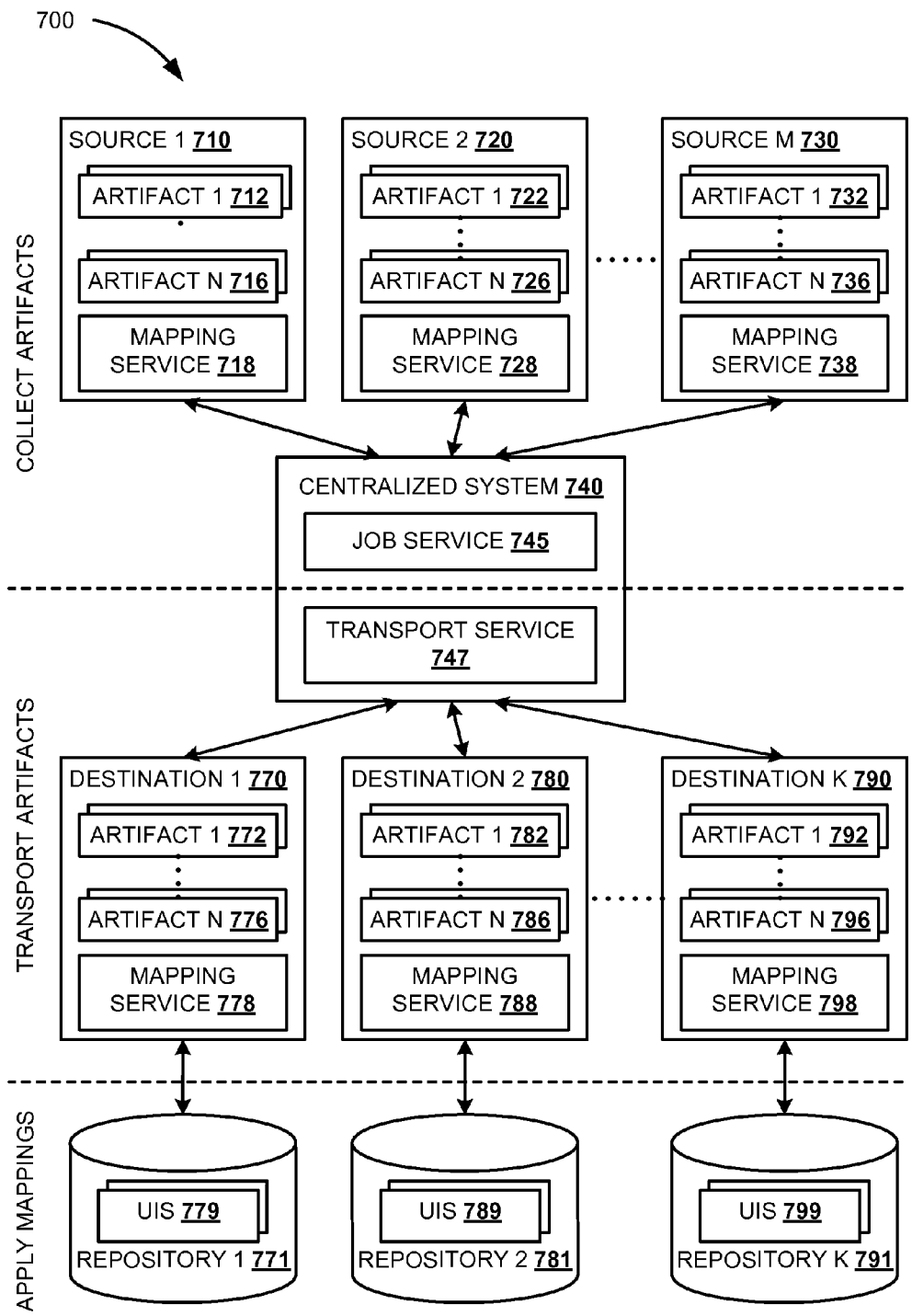
FIG. 7 is a block diagram illustrating computer system landscape nodes along different phases of distributing artifacts, according to one embodiment.

FIG. 7 shows computer system landscape 700 along the phases of distributing artifacts, according to one embodiment. In FIG. 7, environments 710, 720 and 730 are labeled as source environments from where artifacts of different kinds 712-716, 722-726 and 732-736, respectively, are collected. The collected artifacts are transported to destination environments 770, 780 and 790 as artifacts of different kinds 772-776, 782-786 and 792-796, respectively. In one embodiment, the collection of artifacts for transportation may be performed by job service 745 executed in centralized system 740. Transport service 747 of the centralized system 740 may be responsible for the distribution of artifacts from source systems 710, 720 and 730 to destination systems 770, 780 and 790.

When an artifact is transported to one or more of the destination environments 770, 780 or 790, a predefined set of properties of the artifact are read or extracted to be matched against the UIS records 779, 789 or 799, respectively, stored in the local repositories 771, 781 and 791. The received artifact is automatically modified when a matching UIS for the artifact is found, and a mapping to a new state or configuration for that kind of artifacts have been tracked. Mapping services 778, 788 and 798 in destination environments 770, 780 and 790, respectively, may be used for tracking the modifications to the artifacts and/or for automatically update the received artifacts corresponding to the tracked modification, according to one embodiment.

Figure 8:
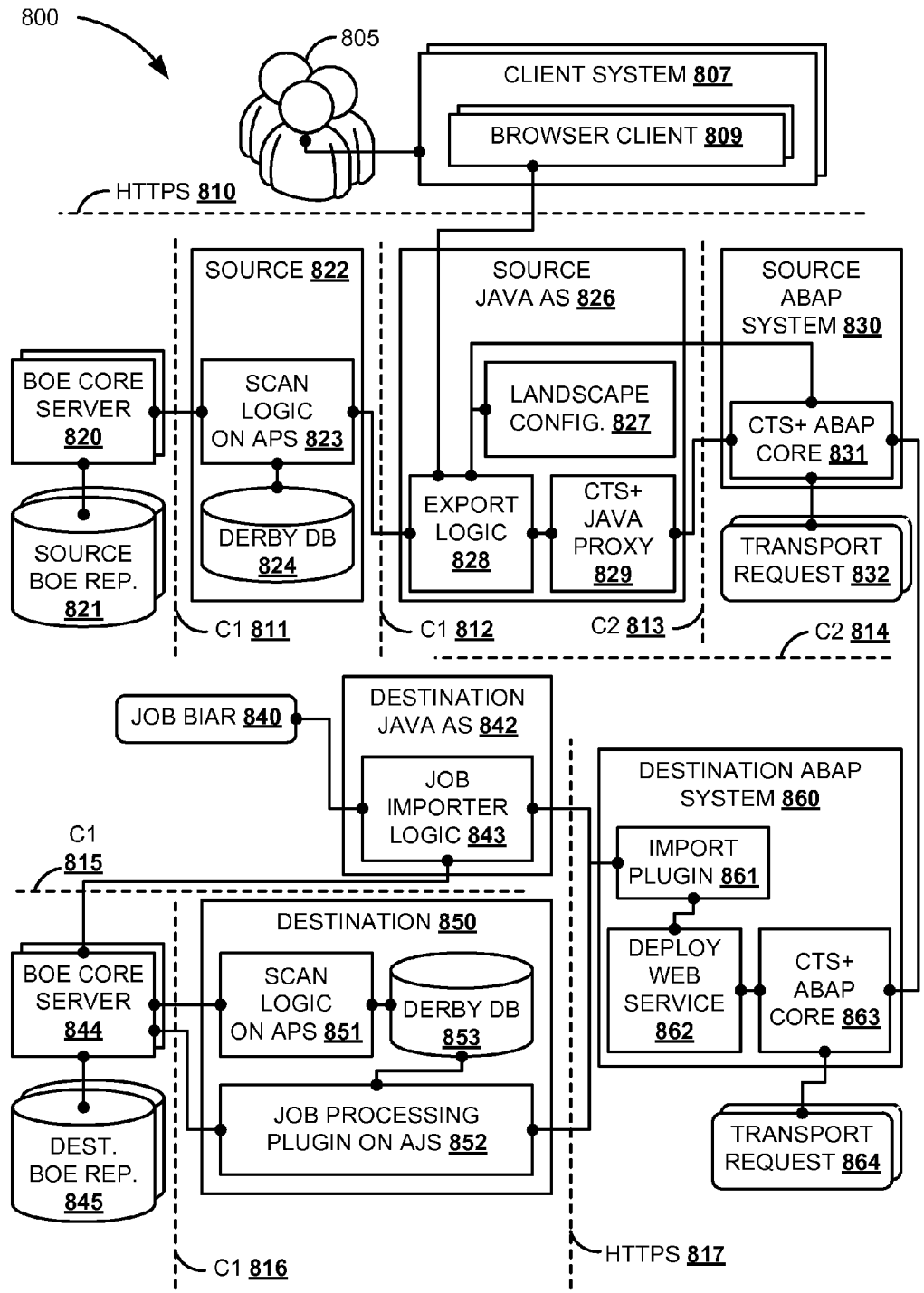
FIG. 8 is a block diagram illustrating a computer system landscape where adaptive change management is implemented, according to one embodiment.

FIG. 8 shows computer system landscape 800 where adaptive change management is implemented, according to one embodiment. Some of the elements of the illustrated landscape 800 correspond to architecture elements specific to SAP AG software products. However, a specialist in the art would recognize equivalent elements or elements with similar structure or functionality developed by other vendors.

In one embodiment, users 805 interact with computer system environment through client systems 807, e.g., using Internet browser client program 809. Different computer systems built on various platforms may be configured to define a number of computer system environments in the landscape 800. The different computer system nodes of the landscape 800 communicate with each other via network 810-817 using different network protocols, e.g., Hypertext Transfer Protocol Secure (HTTPS) 810 and 817; Common Object Request Broker Architecture (CORBA/C1) 811, 812, 815 and 816; Remote Function Call (RFC/C2) 813 and 814; etc.

In one embodiment, a SAP® BusinessObjects™ Business Intelligence Platform, e.g., Business Object Environment (BOE), core server 820 is used as central server to execute adaptive lifecycle management (LCM). The BOE core server 820 may run scan service hosted on its implemented adaptive processing server (APS). The scan service reads objects of different kinds across all possible source repositories, e.g., Derby database (Derby DB®) 824 of source systems 822, source Java® Application Server (Java AS) 826, Source ABAP® System 830. Out of all accumulated source objects of particular kind, a set of predefined properties are extracted to create a matching UIS. The created UISs may be persisted in the source BOE repository 821, e.g. a Derby DBS of the central LCM server 820.

The scanned information is multicast to all possible destination repositories, e.g., Destination BOE Repository 845; Derby DB® 853 of destination computer system 850; destination Java AS 842, destination ABAP® system 860. Change and Transport System (CTS+) framework may be used for this transportation. In one embodiment, the CTS+ framework includes CTS+Java® proxy 829, CTS+ ABAP® Core 831 and 863. Export logic 828 and landscape configuration 827 are modules that may provide export services for the created UISs and for different artifacts.

For example, an UIS created for particular kind of artifacts, e.g., for BI Reports, may be stored as an LCM job, and then passed on to the export engine of source CTS+, e.g. CTS+ Java® proxy 829 in the form of an LCM Business Intelligence Archive (BIAR) file 840. The LCM BIAR file 840 is then put into a Transport Request (TR), e.g., TR 832 and 864, whose path has already been configured to reach required destinations. CTS+ framework sends the LCM BIAR file 840 to each destination repository. For example, the LCM BIAR file 840 may be loaded through job importer logic 843 and processed by an Adaptive Job Server (AJS) at the destination BOE server 844. The corresponding database entries present in the job, e.g., UIS records, are extracted and persisted in the destination Derby DB® BOE repository 845. The database entries may be transferred from the destination BOE repository 845 or directly recorded in Derby DB® 853 of destination system 850 using scan logic on APS 851 and Job processing on AJS 852 modules of the system 850.

Artifacts in the form of LCM jobs may also arrive from the source repositories to the destination environments. When such a job is processed, e.g., by scan logic on APS element 851, the included artifacts are extracted and a set of predefined properties are read to create unique identification sections for the different kinds of artifact. The UIS records stored in the local destination repositories are then searched for a match. In case a match is found, the corresponding mappings are applied, e.g., by job processing on AJS element 852, and the artifact is committed with the applied changes to the destination BOE repositories 845.

In one embodiment, import plugin element 861 may provide Web Unified Resource Locator (URL) where a BIAR job to be uploaded via upload mechanism. The Web upload may be further processed via deploy Web service module 862.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-topeer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
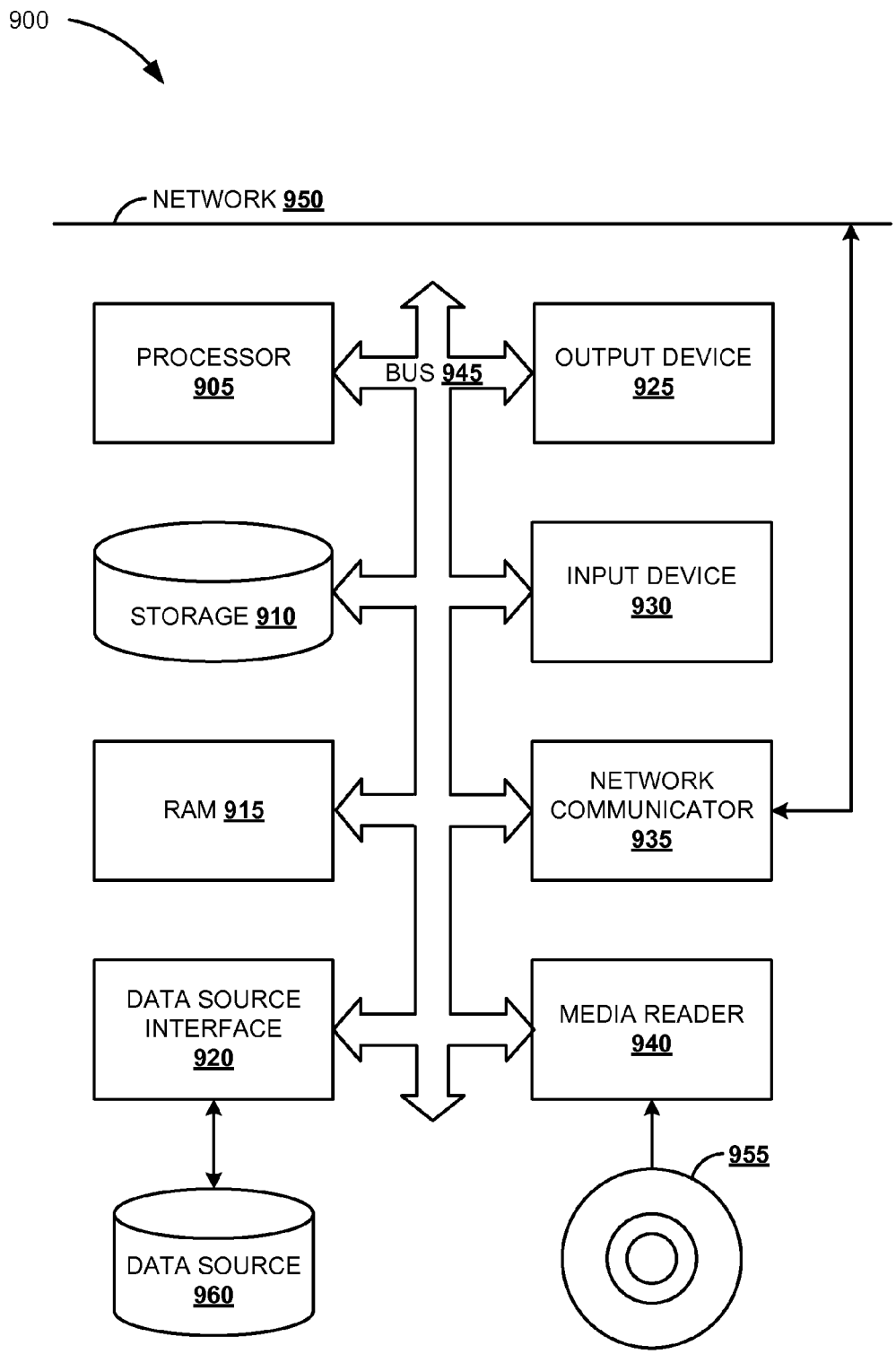
FIG. 9 is a block diagram of an exemplary computer system to execute adaptive change management, according to one embodiment.

FIG. 9 is a block diagram of an exemplary computer system 900. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed via network 950. In some embodiments the data source 960 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computerized method to automatically adapt change management in a computer system landscape, the method comprising:
   at a first computer system from the computer system landscape, receiving an unique identification section including an attribute and a value assigned to said attribute, the unique identification section identifying computer system artifacts of a same kind;

tracking a modification of a first computer system artifact of the same kind by storing a correspondence of an original state of the first computer system artifact to a new state, wherein said first computer system artifact includes said attribute and said value assigned to said attribute;

at the first computer system from the computer system landscape, receiving a second computer system artifact of the same kind transported from a second computer system from the computer system landscape, the second computer system artifact including said attribute and said value assigned to said attribute matching the unique identification section; and upon receiving said transported second computer system artifact, automatically updating said transported second computer system artifact to the new state according to said tracked modification of the first computer system artifact of the same kind.

2. The method of claim 1 further comprising:
scanning at least one repository in said computer system landscape to determine at least one transportable computer system artifact.

3. The method of claim 2 further comprising:
extracting said attribute and said value assigned to said attribute from said at least one transportable computer system artifact.

4. The method of claim 1, wherein tracking said modification comprises:
scanning at least one repository of said computer system landscape to determine said first computer system artifact based on said attribute and said value assigned to said attribute; and
identifying said modification based on a change of at least one property of said first computer system artifact.

5. The method of claim 1, wherein tracking said modification comprises:
registering an operation modifying at least one computer system artifact; and
identifying said first computer system artifact of said at least one computer system artifact based on said attribute and said value assigned to said attribute.

6. The method of claim 1, wherein tracking said modification comprises:
registering an assignment to a new value of said attribute of said first computer system artifact; and
storing a mapping to said new value of said attribute.

7. The method of claim 1, wherein receiving said second computer system artifact comprises:
comparing at least one property of said second computer system artifact to said attribute and said value assigned to said attribute.

8. The method of claim 1, wherein automatically updating said second computer system artifact comprises:
applying said modification to said second computer system artifact based on a stored correspondence between the original state and the new state of said first computer system artifact.

9. A computer system to automatically adapt change management in a computer system landscape, the system comprising:
a processor; and
a memory having instructions stored thereon which when executed by said processor cause said system to:
receive an unique identification section generated based on an attribute of at least one computer system artifact and a first value assigned to said attribute, the unique identification section identifying a plurality of computer system artifacts of a same kind,
track a modification of said at least one computer system artifact by storing a mapping of said attribute to a second value,
receive a computer system artifact of the same kind transported from an external computer system, the computer system artifact having said attribute and said first value assigned to said attribute matching the unique identification section, and
upon receiving said transported computer system artifact, modify said transported computer system artifact to replace said first value assigned to said attribute with said second value according to said stored mapping.

10. The system of claim 9, wherein receiving said attribute comprises:
scanning at least one repository in said computer system landscape to determine at least one transportable computer system artifact from the plurality of computer system artifacts of the same kind.

11. The system of claim 9, wherein tracking said mapping comprises:
receiving said second value to replace said first value of said attribute.

12. The system of claim 9, wherein tracking said mapping comprises:
scanning at least one repository of said computer system landscape to determine said second value assigned to said attribute.

13. A non-transitory computer readable medium storing instructions thereon, which when executed by a processor cause a computer system to:
at a first computer system environment, receive an unique identification section including a predefined set of attributes and a plurality of values assigned to said set of attributes, the unique identification section identifying a plurality of computer system artifacts of a same kind;
track a modification of a first computer system artifact of the plurality of computer system artifacts of the same kind by storing a mapping of an original value of an attribute from the set of attributes of the first computer system artifact to a new value;
at the first computer system environment, receive a second computer system artifact of the plurality of computer system artifacts of the same kind transported from a second computer system environment, wherein said second computer system artifact includes said set of attributes and said plurality of values matching the unique identification section; and
upon receiving said transported second computer system artifact, automatically update said transported second computer system artifact to replace the original value of the attribute with the new value according said tracked modification of the first computer system artifact of the same kind.

14. The computer readable medium of claim 13, wherein receiving said set of attributes comprises:
scanning at least one repository in a computer system landscape to determine at least one transportable computer system artifact;
extracting said set of attributes and said plurality of values assigned to said set of attributes from said at least one transportable computer system artifact; and
generating the unique identification section for the set of artifacts of the same kind based on said set of attributes.

15. The computer readable medium of claim 13, wherein tracking said modification comprises:
- registering an assignment to a new value of an attribute of said set of attributes of said unique identification section; and
- storing a mapping to said new value of said attribute of said set of attributes of said unique identification section.

16. The computer readable medium of claim 13, wherein tracking said modification comprises:
- scanning at least one repository of a computer system landscape to determine said first computer system artifact based on said set of attributes; and
- identifying said modification based on a change of at least one value of said plurality of values assigned to said set of attributes.

17. The computer readable medium of claim 13, wherein tracking said modification comprises:
- registering an operation modifying at least one computer system artifact; and
- identifying said first computer system artifact of said at least one computer system artifact based on said set of attributes and said plurality of values assigned to said set of attributes.

18. The computer readable medium of claim 13, wherein receiving said second computer system artifact comprises:
- comparing at least one property of said second computer system artifact with said set of attributes and said plurality of values assigned to said set of attributes.

19. The computer readable medium of claim 13, wherein automatically updating said second computer system artifact comprises:
- applying said modification to said second computer system artifact based on a stored correspondence between an original state and a modified state of said first computer system artifact.

* * * * *